Nov. 17, 1953  E. A. STALKER  2,659,552
AIRCRAFT SURFACE WITH BOUNDARY LAYER CONTROL
Filed June 9, 1950  2 Sheets-Sheet 1

INVENTOR.
Edward A. Stalker

Nov. 17, 1953 E. A. STALKER 2,659,552
AIRCRAFT SURFACE WITH BOUNDARY LAYER CONTROL
Filed June 9, 1950 2 Sheets-Sheet 2

INVENTOR.
Edward A. Stalker

Patented Nov. 17, 1953

2,659,552

UNITED STATES PATENT OFFICE 2,659,552

AIRCRAFT SURFACE WITH BOUNDARY LAYER CONTROL

Edward A. Stalker, Bay City, Mich.

Application June 9, 1950, Serial No. 167,143

10 Claims. (Cl. 244—40)

The invention relates to wings and other aircraft surfaces and particularly to the reduction of their drag by means of boundary layer control.

An object of my invention is to reduce the profile drag of wings and other aircraft surfaces.

Another object of the invention is to provide a wing or other body of low drag even at high value of the Reynolds number.

Still other objects will apear from the description, drawings and claims.

It has been disclosed in previous applications how a special section contour between slots will stabilize the boundary layer in a laminar condition and greatly reduce the profile drag of a body such as a fuselage or wing surface. In particular my application Serial No. 48,616 filed September 10, 1948 discloses a plurality of slots in each of the upper and lower surfaces of a wing. The wing section contours between slots each have a short length of slightly concave curvature just aft of the slot succeeded by a convex curvature.

As pointed out in the application referred to the portion of the surface extending a short distance rearward from the slot should be flat or preferably somewhat concave in order to provide a favorable gradient between slots of about uniform steepness. However a concave or flat surface lacks the stabilizing quality of a convex surface to keep the flow laminar.

To preserve laminar flow with certainty along this length the manufacturing process must be carefully controlled to provide a surface free of waviness, roughness or undue flexibility. This is costly to do, so that it is desirable to provide other means of insuring the laminar character of the flow while preserving the desired distribution of the pressure gradients between slots or rearward from a slot.

The boundary layer on the surface just aft of the slot can be stabilized by constructing this limited portion of a porous material and applying a suction to the inner side of the surface. That is the surface is given a very fine porosity so that suction applied to the inner surface is distributed in effect over the area along the porous surface. The suction applied to the porous surface is greater than that employed for inducting the flow through the slots but the quantity of air inducted is very much smaller.

The flow over a surface may be kept laminar by applying area suction over substantially the whole surface extending from a short distance aft of the leading edge to the trailing edge. However in wings of large chord such that the Reynolds number based on the whole chord is greater than about 5,000,000 the use of area suction over the whole or major portion of the chord presents great difficulty since it tends to make the boundary layer so thin that surface imperfections or projections protrude through the layer and are exposed to the high velocity stream existing outside the boundary layer with the result that the boundary layer is caused to change from the laminar to the turbulent state because of the turbulence at the exposed end of the projection. This becomes especially serious over the portion of the surface which is normally under an adverse pressure gradient, such as the upper aft portion of a wing.

In the invention of this application the laminar layer is stabilized over surfaces with large Reynolds number by providing means to apply area suction on a limited extent of surface which is followed by a larger extent of surface adapted to produce a favorable gradient by means of its curvature.

Only a very small portion of the layer need be inducted to accomplish the stabilization on the short chordwise expanse of porous surface. Thus the portion of the layer remaining for flow over the convex solid surface is thicker and protuberances on this surface are covered by the layer even when the surface expanse has a large Reynolds number.

The objects described are accomplished by the means illustrated in the accompanying drawings in which—

Fig. 6 is a longitudinal section of another body such as a fuselage or nacelle or the like.

Figure 1:
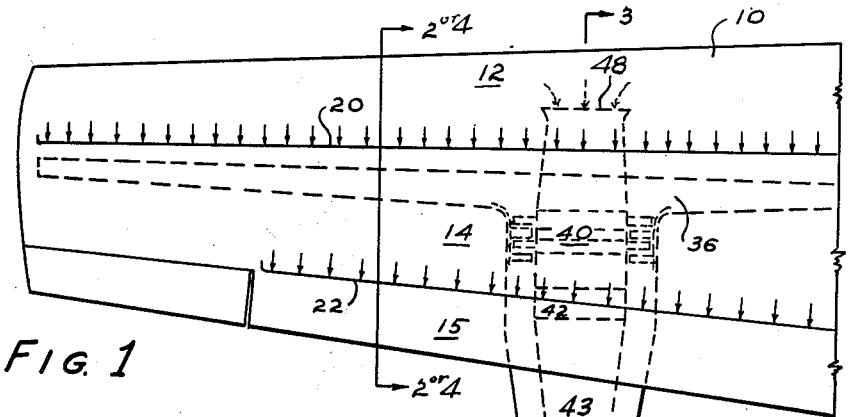
Fig. 1 is a fragmentary top plan view of a wing embodying the invention.
Figure 2:
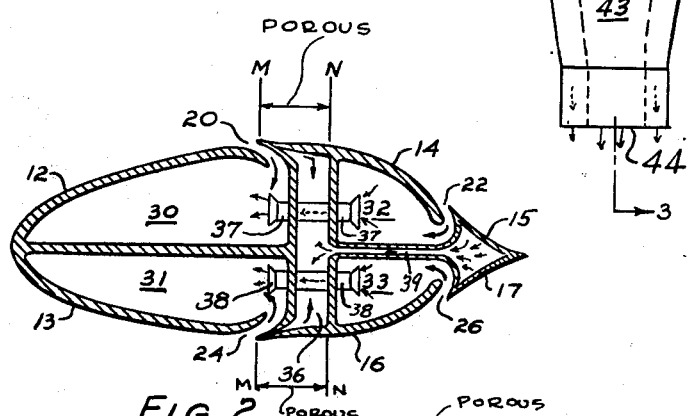
Fig. 2 is a section along line 2—2 in Fig. 1.

Referring particularly to the drawings, the wing is indicated generally as 10. It is comprised of the surfaces 12—17. These are spaced to define the induction slots 20 and 22 in the upper side and the slots 24 and 26 in the lower side.

The rearward surface 14 has a small chordwise extent MN which is preferably concave or at least nonconvex. The same is true of the lower rearward surfaces 16 and the porous surfaces 15 and 17.

The boundary layer is to be in part inducted through the slots and in part through the porous concave surfaces. The air or other fluid is drawn through the slots into the compartments 30—33 while the inflow through the porous surface enters the compartments 36 and 39 which extend spanwise along the wing.

The power plant is adapted to apply different suctions to the different compartments. It includes the compressor means 40, and the turbine 42 which discharges the exhaust gas from nozzle 44 to provide the propulsive jet for the aircraft.

Figure 3:
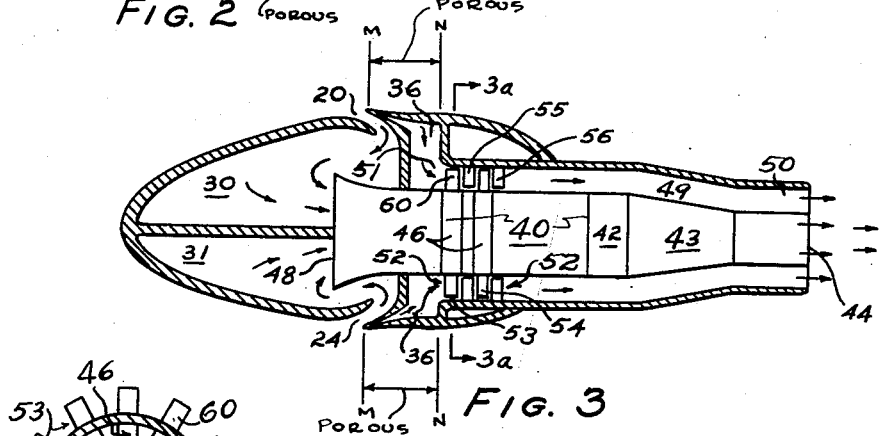
Fig. 3 is a section view of the power plant along line 3—3 in Fig. 1.
Figure 3A:
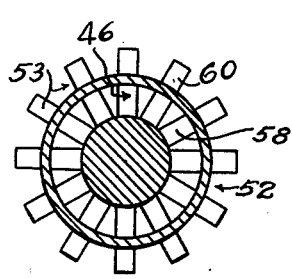
Fig. 3a is a sectional view of the compressor along line 3a—3a in Fig. 3.

As shown in Figs. 3 and 3a the compressor means 40 comprises the external compressor 52 whose inlet is 51, and the internal compressor 46 which inducts its air from the inlet 48 within the wing. This air is discharged from the turbine as exhaust gas through the nozzle 44. The compressor 52 is adapted to induct air from the porous surfaces MN at a greater suction (lower pressure) than for the slots. It discharges this air through duct 49 and exit 50.

The compressor 52 is comprised of the rotor stages 53 and 54 with the stator stages 55 and 56 succeeding the respective rotor stages. Fig. 3a shows one of the rotor stages in cross section. The blades 58 belong to compressor 46 while blades 60 belong to the stage 53 shown in Fig. 3 for inducting fluid through the porous surfaces.

The boundary layer can also be kept laminar along a relatively thick wing section by having a very steep wing contour which gives a very steep favorable pressure gradient. The transition from the very steep positive slope of the forward contour to the negative slope of the rear contour can be accomplished in a very short length of contour preferably just ahead of an induction slot so that the slot suction will influence the pressure gradient ahead of the slot.

However to influence the flow upstream from the slot a relatively greater energy expenditure is required than is the case if all or a portion of the transition length of surface is made porous and a suction is applied to the inner side of this surface. Again the suction and volume of inducted air is significantly different from the values for the slot.

Figure 4:
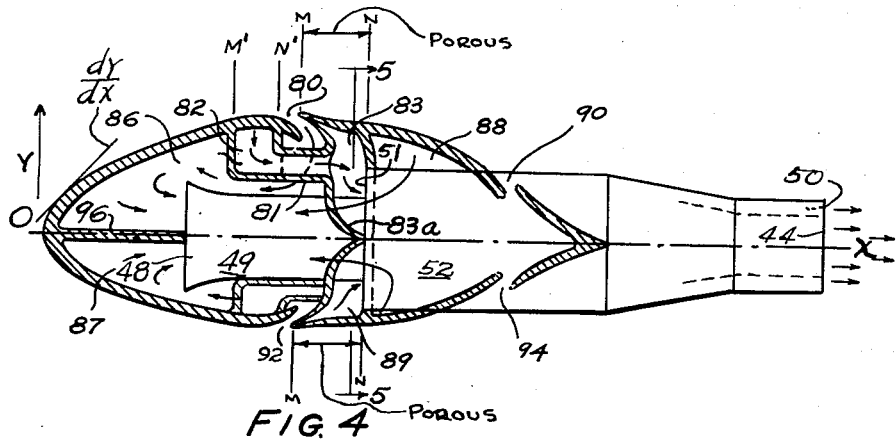
Fig. 4 is an alternate wing section along line 4—4 in Fig. 1.

Thus in Fig. 4 the wing section upper contour has a steep positive slope $dy/dx$ greater than 0.10 from O to M', a rapid transition from M' to N'. In order for the flow to remain laminar along M'N' the suction exercised through the slot 80 must be of considerable magnitude in order to influence the flow significantly upstream from the slot. There is therefore a tendency to induct more of the inner portion of the boundary layer than is best for the attainment of the minimum drag. That is a sufficient enough portion of the boundary layer should remain for flow over the surface aft of the slot so that this aft surface is rubbed only by low velocity fluid such as comprises the inner portions of the boundary layer, that is portions normally nearer the surface of the wing than the boundary between the main flow and the boundary layer.

In Fig. 4 the inlet 51 of compressor 52 communicates only with compartments 82 and 83. The latter has a bottom wall 83a shown in Fig. 5 extensive spanwise to separate this compartment from the compartments 86—87. Thus the compressor 52 withdraws air from compartments 82 and 83 serving the porous concave surfaces. The inlet 48 serving compressor 46 withdraws air from the compartments 86—87.

The compartment 82 extends spanwise along the wing and is in communication with compartment 83 by way of a plurality of chordwise ducts 81 of limited spanwise width.

The transition section begins where the slope $dy/dx$ of the chordwise or airfoil section contour has a slope of 0.10 and ends on the rear side of the maximum thickness ordinate where the slope is —0.10 or at a slot whichever is nearer the maximum ordinate. The transition section is further characterized by extending chordwise along a length no greater than 20 per cent of the wing chord length and substantially centralized over the maximum thickness ordinate. In bodies having a plurality of chordwise spaced slots it is more convenient to refer the extent of the transition section to the surface length between slots and when expressed in this manner the transition length should be less than 20 per cent of the length of the surface length between slots.

The magnitude of the suction at slot 80 can be reduced and a smaller amount of boundary layer can be abstracted by making the transition portion M'N' porous. Thus in Fig. 4 suction is applied to the compartment 82 for the induction of a limited amount of boundary layer through M'N' and a different suction is applied to compartments 86—89 for induction of boundary layer air through slots 80 and 90 as well as 92 and 94 to provide a proper gradient over the surface aft of each of the slots.

Figure 5:
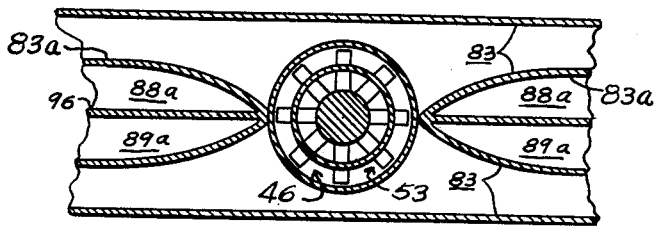
Fig. 5 is a fragmentary section along line 5—5 in Fig. 4.

The rear vertical walls of the compartment 83 extends to the vertical center of the wing only at the compressor as shown in Fig. 5. A short distance away from the compressor the compartments 83 terminate vertically short of each other providing the passageways 88a and 89a respectively communicating between compartments 86 and 88, and 87 and 89.

The horizontal wall 96 divides the upper compartments 86 and 88 from the lower compartments 87 and 89.

Figure 6:
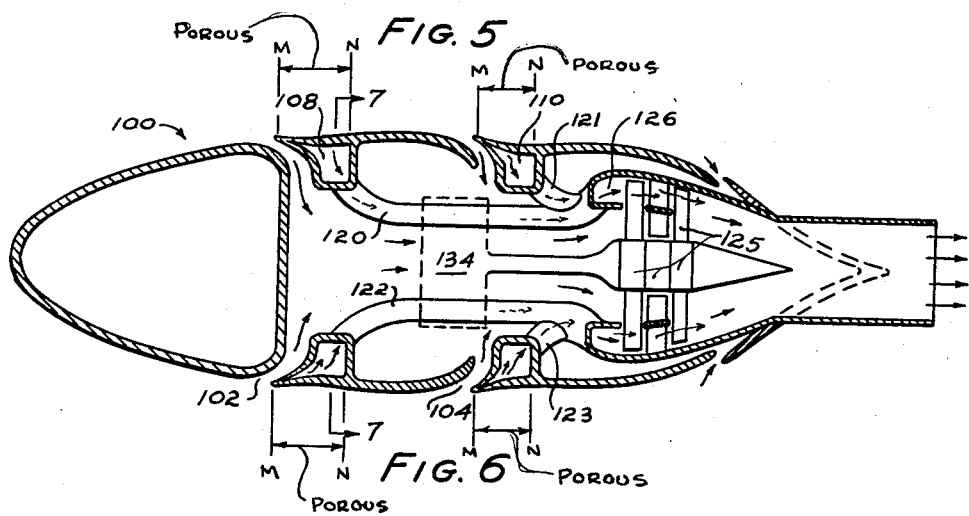
Figure 7:
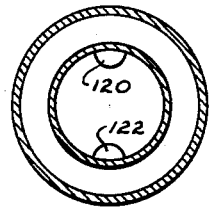
Fig. 7 is a section along line 7—7 in Fig. 6.

Figs. 6 and 7 show the application of the invention to a body 100 such as a fuselage or nacelle. This body has slots 102—104 which extend transversely about the body. Aft of each slot the surface is concave for a short distance MN and then it is convex for the major portion of the length between slots.

The external walls of the concave portions MN are porous. The porosity leads into the annular compartments 108 and 110. Ducts 120—123 lead from the annular compartments 108 and 110 to annular inlet chamber 126 which delivers air to the outer annular portion of the compressor rotors where the suction pressure is high. The inner portion of the compressor 125 has access to the slots to induct boundary layer at a relatively lower suction.

The compressor is driven by some suitable source of power 134.

A disadvantage of a porous surface is that the openings of the porosity gradually become clogged with foreign particles. To some extent these may be removed by a suction applied to one side but even this procedure fails ultimately since all particles are not removed and since inflow on the reverse side carries particles into the openings.

In this invention the problem is solved by making the size of the openings of the porosity so small that practically no foreign particles will enter. This requires that the suction be greatly increased for a given thickness of porous wall. This invention ameliorates this disadvantage by limiting the chordwise expanse of the porous surface in which case the thickness of the porous wall can be decreased while still maintaining adequate strength. The amount of suction required to force a given volume through a porous surface is inversely proportional to the thickness. Thus the thickness should be reduced as the fineness of the porosity is increased to keep the suction power low.

Where the porous surface is made from fine grains bonded together by heat or an adhesive, the grains should pass through a sieve of 600 or more openings to the square inch. Then the resultant porosity will be fine enough to prevent small particles of material from entering and wedging themselves in the interstices of the porous material.

While I have illustrated specific forms of the invention, it is to be understood that variations may be made therein and that I intend to claim my invention broadly as indicated by the appended claims.

I claim:

1. In combination in a wing, a fore surface, a rear surface, means supporting said surfaces in chordwise spaced relation to define an induction slot between said surfaces in the upper side of said wing, said rear surface including a porous nonconvex surface portion extensive chordwise from said slot along a minor fraction of the chordwise extent of said rear surface succeeded by a chordwise convex nonporous surface portion, and compartment means providing at least two separate sources of different pressures in communication respectively with said slot and said porous surface to induce flows of fluid inward through said slot and said porous surface with a greater internal suction at said porous surface than at said slot.

2. In combination in a wing adapted to be bathed externally by a flow of fluid, a fore surface, a rear surface, means supporting said surfaces in chordwise spaced relation to define an induction slot between said surfaces, said rear surface including a porous surface portion extensive chordwise from said slot along a minor fraction of the chordwise extent of said rear surface succeeded by a chordwise convex surface portion, and means to induce flows of fluid inward through said slot and said porous surface, the external chordwise contour of said porous surface being concave relative to the rearward adjacent portion of said rearward surface to provide a continuously decreasing external fluid pressure rearward from said slot across said rear surfaces.

3. In combination in a wing adapted to be bathed by a fluid, a fore surface, a rear surface, another surface supporting said fore and rear surfaces in chordwise spaced relation to define an induction slot between said fore and rear surfaces extending along a major portion of the span of said wing for controlling the boundary layer fluid, said fore surface comprising an accelerating surface and an adjacent porous transition surface positioned aft of said accelerating surface, said surfaces defining a locality of maximum thickness of said wing along the chord thereof, said accelerating surface having a chordwise contour whose slope is not less than 0.10, said transition surface extending fore and aft of said locality of maximum thickness of said wing between points on the chordwise contour thereof having arithmetic magnitudes of the slopes at said points equal to 0.10 defining a transition length less than 20% of the wing chord length, and separate means to induce inward flows of fluid through said porous surface and said slot.

4. In combination in a wing, an upper fore surface, an upper rear surface, a lower surface supporting said fore and rear surfaces in chordwise spaced relation to define an induction slot between said surfaces extending along a major portion of the span of said wing for controlling the boundary layer fluid, said surfaces defining a maximum thickness ordinate of said wing and a locality forward thereof where the chordwise slope of the wing contour is 0.10 said fore surface comprising an accelerating surface and an adjacent transition surface positioned aft of said accelerating surface, said accelerating surface having a chordwise contour whose slope is not less than 0.10, said transition surface having a porous portion extensive chordwise over the maximum thickness ordinate of said wing, and separate duct means to induce inward flows of fluid through said porous surface and said slot, said transition surface extending chordwise forwardly of said ordinate for a distance less than about 10% of said wing chord length to the locality where said slope is equal to 0.10.

5. In combination, a forward surface, a rearward surface, means supporting said surfaces in longitudinally spaced relation to define a body adapted to be bathed by a fluid flowing longitudinally therealong, said surfaces defining an induction slot therebetween, said slot having a narrow width in said longitudinal direction and a large length transverse thereto adapting said slot for inducting boundary layer fluid, said rearward surface comprising a nonconvex porous surface portion extensivee longitudinally from said slot along a minor fraction of the longitudinal extent of said rearward surface succeeded by a longitudinal convex surface portion, and power suction means providing at least two sources of different pressures in communication respectively with said slot and said porous surface to induce flows of fluid inward through said slot and said porous surface with pressures of different magnitude internally at said surface and said slot.

6. In combination, a forward surface, a rearward surface, means supporting said surfaces in longitudinally spaced relation to define a body adapted to be bathed by a fluid flowing longitudinally therealong, said surfaces defining an induction slot therebetween, said rearward surface comprising a longitudinally concave porous surface portion extensive longitudinally from said slot along a minor fraction of the longitudinal extent of said rearward surface, said surface portion aft of said porous portion being convex along the longitudinal extent thereof, and means to induce flows of fluid inward through said slot and said porous surface, said longitudinal contour of said rearward surface providing for a continuously decreasing fluid pressure from said slots rearward over said rearward surface therealong.

7. In combination, a forward surface, a rearward surface, means supporting said surfaces in longitudinally spaced relation to define a body adapted to be bathed by a fluid flowing longitudinally therealong, said surfaces defining an induction slot therebetween for inducting boundary layer fluid, said forward surface comprising an accelerating surface and an adjacent porous transition surface positioned aft of said accelerating surface, said accelerating surface having a longitudinal contour whose slope is not less than 0.10, said transition surface extending fore and aft between points on the contour whose arithmetical magnitudes of the slopes at said points are equal to 0.10 defining a transition length less than 20% of the surface length ahead of said slot, and separate means to induce inward flows of fluid through said porous surface and said slot.

8. In combination, a forward surface, a rearward surface, means supporting said surfaces in longitudinally spaced relation to define a body adapted to be bathed by a fluid flowing longitudinally therealong, said surfaces defining an induction slot therebetween for inducting boundary layer fluid, said forward surface comprising an accelerating surface and an adjacent porous transition surface positioned aft of said accelerating surface and ahead of said slot, said accelerating surface having a longitudinal contour whose slope is not less than 0.10, and means to induce inward flows of fluid through said porous surface and said slot, said transition surface extending longitudinally forward from said slot for a distance less than 20% of the length of said forward body.

9. In combination in an upper wing, a fore surface, an upper rear surface, means supporting said surfaces in chordwise spaced relation to define an induction slot between said surfaces, said slot extending spanwise in the upper side of said wing along a major portion of the span thereof said rear surface including a concave porous surface portion extensive rearward chordwise from said slot along a minor fraction of the chordwise extent of said rear surface, and power means to apply suctions of different magnitude from within the wing to said porous surface and said slot to induce inward flows of boundary layer fluid therethrough.

10. In combination, a forward surface, a rearward surface, means supporting said surfaces in longitudinally spaced relation to define a body adapted to be bathed by a fluid flowing longitudinally therealong, said surfaces defining an induction slot therebetween, said slot having its narrow width in the longitudinal direction adapting it for induction of boundary layer fluid said rearward surface comprising a porous surface portion extensive longitudinally from said slot along a minor fraction of the longitudinal extent of said rearward surface and being concave relative thereto, and power means to apply suctions of different magnitude from within to said porous surface and said slot to induce inward flows of boundary layer fluid therethrough.

EDWARD A. STALKER.

References Cited in the file of this patent

UNITED STATES PATENTS

| Number | Name | Date |
| --- | --- | --- |
| 1,691,942 | Stalker | Nov. 20, 1928 |
| 1,829,616 | Stalker | Oct. 27, 1931 |
| 2,431,592 | Stalker | Nov. 25, 1947 |
| 2,447,100 | Stalker | Aug. 17, 1948 |
| 2,477,637 | Mercier | Aug. 2, 1949 |

FOREIGN PATENTS

| Number | Country | Date |
| --- | --- | --- |
| 479,598 | Great Britain | Feb. 7, 1938 |

OTHER REFERENCES

"Aero Digest," April 1, 1945, published by The Aeronautical Digest Magazine Publishing Co., 3110 Elm Ave., Baltimore, Md., pp. 98, 99 and 170 of interest. (Copy in Div. 22.)

N. A. C. A. Technical Note, published by National Advisory Committee No. 1741 for Aeronautics, Washington, D. C., Nov. 1948, pp. 3 and 11 relied on. (Copy in Div. 22.)